(Model.)

J. M. WALDEN.
COTTON CHOPPER.

No. 258,512. Patented May 23, 1882.

WITNESSES:
Gustave Dieterich
C. Sedgwick

INVENTOR:
J. M. Walden
BY Munn & Co
ATTORNEYS.

UNITED STATES PATENT OFFICE.

JOHN M. WALDEN, OF FORT VALLEY, GEORGIA.

COTTON-CHOPPER.

SPECIFICATION forming part of Letters Patent No. 258,512, dated May 23, 1882.

Application filed March 13, 1882. (Model.)

*To all whom it may concern:*

Be it known that I, JOHN M. WALDEN, of Fort Valley, in the county of Houston and State of Georgia, have invented a new and Improved Cultivator and Cotton-Chopper, of which the following is a full, clear, and exact description.

This invention consists of an improved machine for scraping the weeds and other matters away from each side of the rows of cotton or other plants, chopping out portions of the plants for thinning them, and supplying fresh earth to the roots, the said machine being designed with the object of providing simpler and at the same time more effective machines than those now used, the construction and arrangement being as hereinafter described.

Reference is to be had to the accompanying drawings, forming part of this specification, in which similar letters of reference indicate corresponding parts in all the figures.

Figure 1:
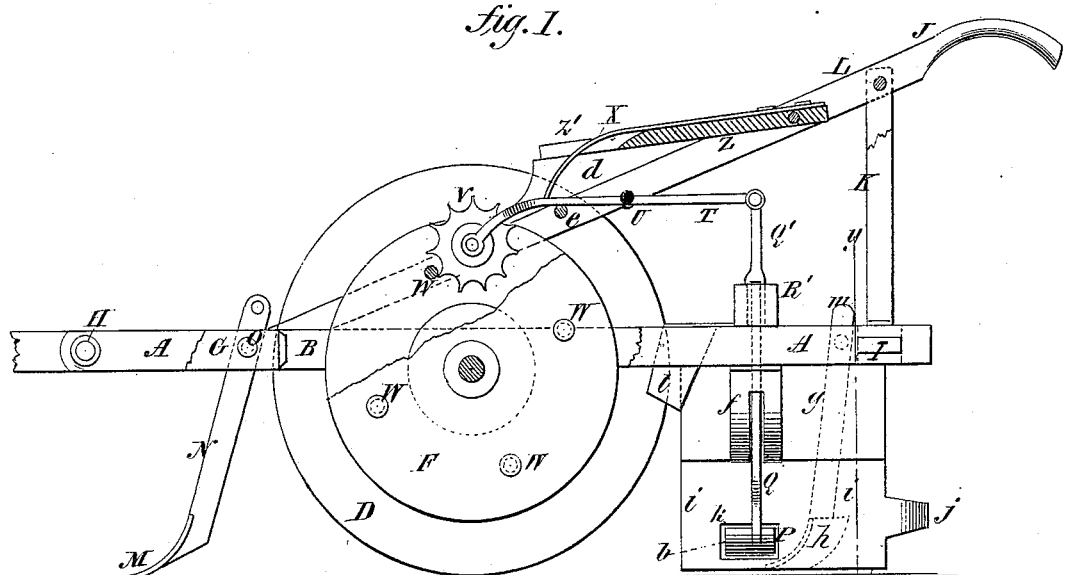
Figure 2:
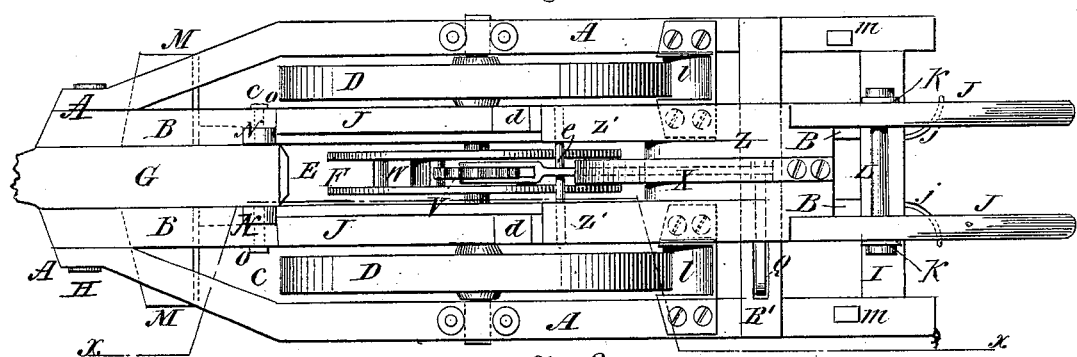
Figure 3:
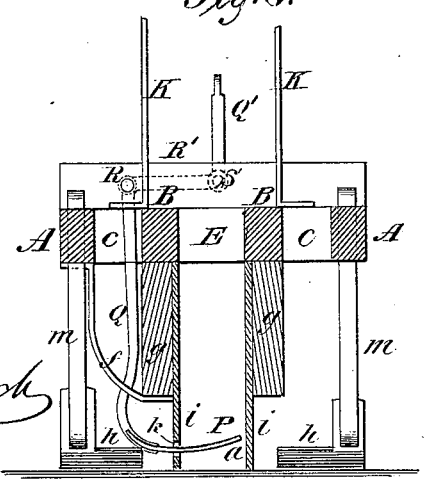

Figure 1 is a longitudinal sectional elevation of a portion of the machine and a side elevation of the rest, the section being taken on the line $x\ x$ of Fig. 2. Fig. 2 is a plan view, and Fig. 3 a transverse section taken on the line $y\ y$ of Fig. 1.

A represents two outer parallel bars, and B two inner bars, of the frame, arranged with outer longitudinal spaces, $c$, wherein the wheels D are located, and an inner space, E, in which the wheel F that works the chopper runs. At the front end of the frame the tongue G is also fitted in the space between bars B, and the outside bars, A, are inclined toward and fitted against the bars B, and all the bars and the tongue are secured by the bolt H in a simple but substantial arrangement. At the rear end all the bars are framed together with the cross-bar I, also in a substantial manner. The handles J are supported above the rear cross-bar, I, by the standards K, and connected together by the rod L, which also connects the standards to the handles. From the standards the bars of the handles project forward on a descending incline to near the front of the wheels, where they are secured to the bars B of the frame.

The scrapers for cutting and scraping the weeds, earth, and other matters away from the plants along each side of the rows are suspended from the frame at M, a little in advance of the wheels, by the stocks N, fitted in slightly-inclined grooves cut in the inner sides of the bars B before the tongue is fitted in, so that when the tongue is put in it closes said grooves, and the stocks are fastened by a bolt, O, which is removable to allow the scrapers to be shifted for cutting deep or shallow, as may be required, the stocks being made so as to shift up or down in the grooves, and being provided with two or more holes for the bolt.

The wheels D, being located in the spaces $c$ of the frames, follow in the smooth ways scraped by the scrapers M, and thus the machine runs smoothly and easily and does the work much better than if the wheels ran outside of said ways on rougher ground.

Next after the scrapers the chopper P follows to chop out portions of the plants at intervals along the row, for thinning them. The chopper consists of a thin and slightly-curved blade, that chops crosswise of the row by its end $a$, and also cuts lengthwise of the row by its edge $b$, moved forward by the machine. The said chopper is attached to the lower end of the elbow-lever Q, pivoted at its elbow R to the slotted beam R' on the top of the frame, and having its upper horizontal arm jointed to link Q' at S, to connect with the working-lever T, which is pivoted upon the handles at U, and carries in its front forked end a spur-wheel, V, that is intermittently rotated and thereby raised to retract the chopper by the tappets or bars W of the before-mentioned wheel F. The spring X thrusts the chopper forward across the row of plants by pressing the front arm of the lever T down again after the spur-wheel has escaped from the bars W of the wheel F. This spring is attached to a piece, Z, of plank mounted on the handles and risers $d$ thereon, the plank being notched at the front and prolonged at Z', each side of the spring, for guards to protect the spring from injury to itself or doing injury to the attendant. A rod, $e$, extends across from one handle to the other under the lever where the spring bears upon it, for a stop to limit the throw of the chopper by the spring.

It will be noticed that the thrust of the chopper forward by the spring is very quick, after which the chopper rests a while before its withdrawal by the wheel F begins, and it is withdrawn slower than it is thrust forward by the spring. During the said rest and withdrawal it cuts by its front edge, b, the plants against which it is drawn by the forward movement of the machine. Thus the chopper cuts away more of the plants than are allowed to remain and more effectually accomplishes the requisite amount of thinning of the plants than if withdrawn as quickly as thrust forward.

The chopper-lever Q is arranged within the slot of a curved guard, f, projecting downward from one of the outside bars, A, of the frame, to which it is fastened at the upper end, and at its lower end said guard is attached to one of the pendent guard-supports g, to protect lever Q from undue strain either forward or backward along the row.

Directly behind the chopper are the scrapers h for throwing up the fresh earth to the plants, and between them and the plants the guards i are located by attachment to the pendent supports g, to prevent too much earth being thrown upon the plants, and at the rear the said guards have the outwardly-curving scrapers j, higher at the lower edge than the lower edge of the guards, to scrape the excess of earth away, only allowing what may pass under them from the scrapers h to reach the plants. One of the guards i is extended forward of the chopper, and has a slot, k, for the chopper to work through for a guide and to clear the hoe. The scrapers h are attached to the frame by stock m, similar to stocks N.

l represents scrapers fixed behind the wheels, to clear them of earth that may attach to them.

Having thus fully described my invention, I claim as new and desire to secure by Letters Patent—

1. In a cotton-chopper, the combination, with choppers P and scrapers h, of the guards i, having rear curved extensions, j, higher in the lower edge than said guards, as and for the purpose described.

2. In a cotton-chopper, the combination, with the frame-blocks g and choppers P Q, of the guard i, extended forward of the chopper and having slot k, as and for the purpose specified.

3. The combination of the spur-wheel V, wheel F, having bar-tappets W, working-lever T, and the spring X, with the elbow-lever Q and chopper P, substantially as specified.

JOHN MILLEDGE WALDEN.

Witnesses:
AARON HARDY CLARK,
J. D. MARSHALL.